(12) United States Patent
Koskinen et al.

(10) Patent No.: US 10,736,027 B2
(45) Date of Patent: Aug. 4, 2020

(54) METHOD AND APPARATUS FOR DISTRIBUTING LOAD

(71) Applicant: Nokia Technologies Oy, Espoo (FI)

(72) Inventors: Jussi-Pekka Koskinen, Oulu (FI); Ilkka Keskitalo, Oulu (FI); Jarkko Koskela, Oulu (FI); Jorma Kaikkonen, Oulu (FI)

(73) Assignee: Nokia Technologies Oy, Espoo (FI)

( * ) Notice: Subject to any disclaimer, the term of this patent is extended or adjusted under 35 U.S.C. 154(b) by 583 days.

(21) Appl. No.: 14/763,523

(22) PCT Filed: Feb. 22, 2013

(86) PCT No.: PCT/FI2013/050202
§ 371 (c)(1),
(2) Date: Jul. 27, 2015

(87) PCT Pub. No.: WO2014/128341
PCT Pub. Date: Aug. 28, 2014

(65) Prior Publication Data
US 2015/0365888 A1  Dec. 17, 2015

(51) Int. Cl.
*H04M 1/00* (2006.01)
*H04W 28/02* (2009.01)
*H04W 48/18* (2009.01)
*H04W 36/22* (2009.01)
(Continued)

(52) U.S. Cl.
CPC ........... *H04W 48/18* (2013.01); *H04W 36/22* (2013.01); *H04W 48/16* (2013.01); *H04W 88/06* (2013.01)

(58) Field of Classification Search
CPC ..... H04W 48/18; H04W 72/02; H04W 48/16; H04W 88/06; H04W 4/50; H04W 76/15; H04W 28/08; H04W 36/22; H04W 24/10; H04W 48/20; H04W 8/04; H04W 88/08; H04W 48/12; H04W 8/26; H04M 1/725; H04M 2250/10; H04L 67/104;
(Continued)

(56) References Cited

U.S. PATENT DOCUMENTS

| | | | |
|---|---|---|---|
| 7,698,055 B2* | 4/2010 | Horvitz | G08G 1/0104 342/357.31 |
| 8,688,166 B2* | 4/2014 | Gupta | H04W 76/027 455/435.2 |
| 9,148,820 B2* | 9/2015 | Yang | H04W 28/08 |

(Continued)

FOREIGN PATENT DOCUMENTS

| | | |
|---|---|---|
| CN | 102395157 A | 3/2012 |
| EP | 2056609 A1 | 5/2009 |

(Continued)

*Primary Examiner* — Edan Orgad
*Assistant Examiner* — Vanneilian Lalchinthang
(74) *Attorney, Agent, or Firm* — Laine IP Oy

(57) ABSTRACT

In accordance with an example embodiment of the present invention, there is provided an apparatus, comprising a receiver configured to receive a first distribution factor relating to using a first access, at least one processing core configured to determine, using a probabilistic procedure, based at least in part on the first distribution factor, whether the apparatus is to use the first access, and wherein the at least one processing core is configured to, based on a result of the determination, select an access and to cause the apparatus to use to the selected access.

21 Claims, 6 Drawing Sheets

(51) Int. Cl.
*H04W 48/16* (2009.01)
*H04W 88/06* (2009.01)

(58) Field of Classification Search
CPC ... H04L 1/1861; H04L 5/0048; H04L 5/0055; H04L 5/0073
USPC .......................................................... 370/338
See application file for complete search history.

(56) References Cited

U.S. PATENT DOCUMENTS

| | | | |
|---|---|---|---|
| 2008/0039104 A1* | 2/2008 | Gu | H04W 8/04 455/445 |
| 2008/0070618 A1* | 3/2008 | Hjelm | H04W 48/18 455/552.1 |
| 2010/0304747 A1 | 12/2010 | Kazmi et al. | |
| 2010/0322070 A1 | 12/2010 | Wang et al. | |
| 2011/0009126 A1 | 1/2011 | Lee | |
| 2012/0057456 A1* | 3/2012 | Bogatin | H04W 28/08 370/230.1 |
| 2012/0196644 A1* | 8/2012 | Scherzer | H04W 48/18 455/524 |
| 2012/0230191 A1 | 9/2012 | Fang | |
| 2013/0021962 A1* | 1/2013 | Hu | H04W 48/20 370/315 |
| 2013/0058274 A1* | 3/2013 | Scherzer | H04W 12/08 370/328 |
| 2013/0078985 A1* | 3/2013 | Savolainen | H04L 29/12952 455/418 |
| 2013/0114408 A1* | 5/2013 | Sastry | H04W 28/02 370/231 |
| 2013/0322320 A1* | 12/2013 | Lee | H04W 48/12 370/312 |
| 2014/0003239 A1* | 1/2014 | Etemad | H04W 28/08 370/235 |

FOREIGN PATENT DOCUMENTS

EP 2461631 A2 6/2012
WO WO 2011148234 A1 12/2011

\* cited by examiner

METHOD AND APPARATUS FOR DISTRIBUTING LOAD

TECHNICAL FIELD

The present application relates generally to controlling or affecting the behavior of mobile user equipments.

BACKGROUND

Wireless communication systems may comprise cellular and non-cellular aspects. Cellular wireless communication systems may comprise, for example, long term evolution. LTE, and wideband code division multiple access, WCDMA, systems. Non-cellular wireless communication systems may comprise, for example, wireless local area network, WLAN, and worldwide interoperability for microwave access, WiMAX, systems. In some networks, both cellular and non-cellular subnetworks, or accesses, are present to offer subscribers optimized service. Cellular systems may offer reliable and secure connectivity for mobile subscribers on a nationwide, or indeed even broader, scale, while non-cellular systems may be used to provide high capacity on a more localized basis.

Cellular systems achieve wide coverage by dividing a coverage area of a cellular network into cells, each cell being controlled by a base station. A mobile engaged in an active communication that moves from one cell to another may be handed over to the new cell responsive to the network nodes collaboratively deciding the new cell is better suited to offer service to the mobile.

Where networks offer both cellular and non-cellular service, non-cellular service may be present within a coverage area of at least one cellular cell. In other words, the coverage areas of cellular and non-cellular service may overlap. When a mobile is disposed in an area of such overlap, it may obtain service from either the cellular or the non-cellular service. The mobile may be configured to select the service to use, for example based on preference rules specific to specific types of connections the mobile may require. For example, should a mobile in an overlap area need voice telephone service, it may be configured to seek it from the cellular service. On the other hand of the mobile in the area of overlap need to transfer a large data file, it may be configured to seek to transfer the file via the non-cellular service.

SUMMARY

Various aspects of examples of the invention are set out in the claims.

According to a first aspect of the present invention, there is provided an apparatus, comprising a receiver configured to receive a first distribution factor relating to using a first access, at least one processing core configured to determine, using a probabilistic procedure, based at least in part on the first distribution factor, whether the apparatus is to use the first access, and wherein the at least one processing core is configured to, based on a result of the determination, select an access and to cause the apparatus to use to the selected access.

According to a second aspect of the present invention, there is provided a method, comprising receiving a first distribution factor relating to using a first access, determining, using a probabilistic procedure, based at least in part on the first distribution factor, whether an apparatus is to use the first access, and selecting, based on a result of the determination, an access and causing the apparatus to use to the selected access.

According to a third aspect of the present invention, there is provided an apparatus, comprising at least one processor, at least one memory including computer program code, the at least one men wry and the computer program code configured to, with the at least one processor, cause the apparatus to bast derive, based at least in part on load situations of a first access and a second access, at least a first distribution factor relating to the first access, the distribution factor being a probabilistic factor, and cause load balancing to occur between at least the first access and the second access by transmitting at least the first distribution factor.

According to a fourth aspect of the present invention, there is provided a method, comprising deriving, based at least in part on load situations of a first access and a second access, at least a first distribution factor relating to the first access, the distribution factor being a probabilistic factor, and causing load balancing to occur between at least the first access and the second access by transmitting at least the first distribution factor.

According to further aspects of the present invention, computer programs are provided, the programs being configured to cause methods in accordance with the second and fourth aspect to be performed.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are understood by referring to FIGS. 1 through 6 of the drawings.

Figure 1:
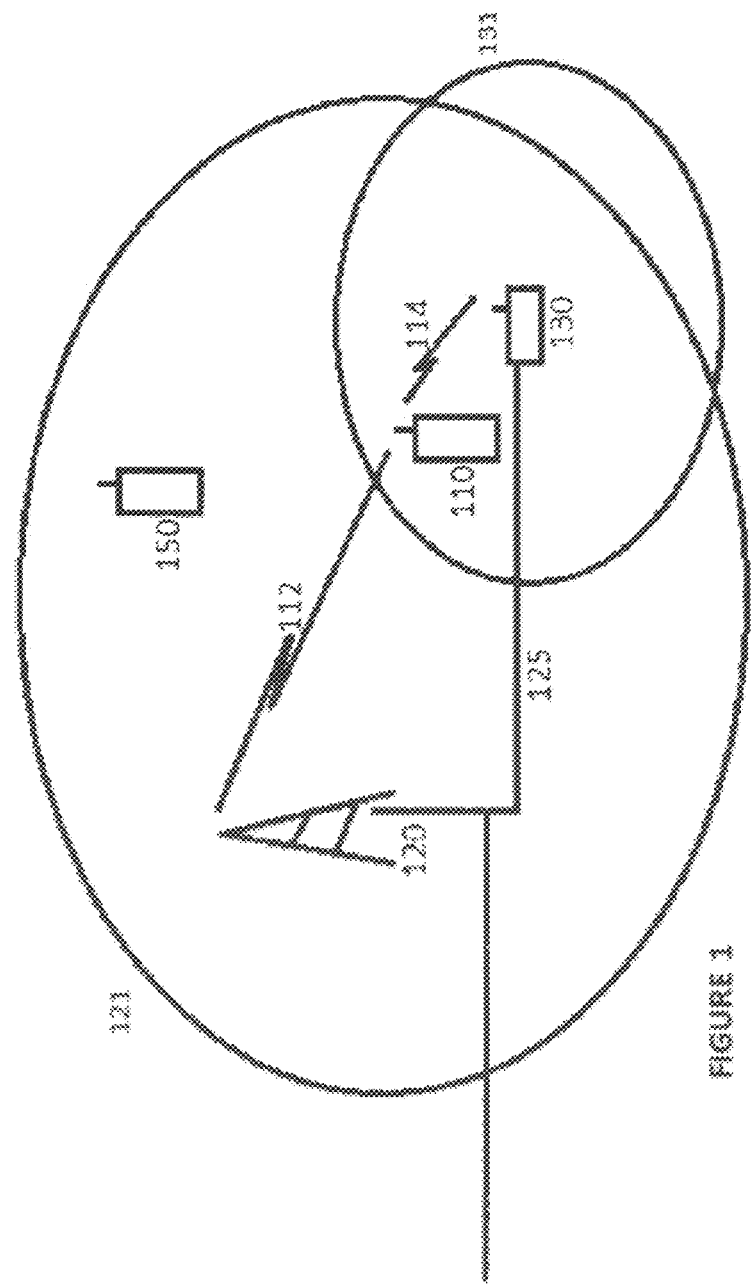
FIG. 1 illustrates an example system capable of supporting at least some embodiments of the invention.

FIG. 1 illustrates an example system capable of supporting at least some embodiments of the invention. In FIG. 1 is illustrated mobile 110, which may comprise, for example, a user equipment, cellular telephone, laptop computer, tablet computer, personal digital assistant, PDA, or other mobile device with connectivity functions. An example of structure of mobile 110 is presented in FIG. 2. Mobile 110 is illustrated as being disposed in a cell coverage area of cell 131, which is controlled by access point 130. Access point 130 may comprise a non-cellular access point, such as a WLAN or WiMAX access point. Access point 130 may be configured to offer connectivity service to wireless equipments in cell 131. Access point 130 may be configured to limit access to cell 131 to a set of subscribers, such as for example subscribers of a network operator that is responsible for operating access point 130. Access point 130 may offer encrypted service, whereby access to cell 131 may be limited to persons who know an encryption key needed to open the encryption, or who use mobiles that are furnished with the encryption key, for example by a network operator. Access point 130 is illustrated as being in contact with further nodes via connection 125.

In addition to cell 131, mobile 110 is illustrated as being disposed in a cell coverage area of cell 121, which is controlled by base station 120. Base station 120 and cell 121 may be configured to operate in accordance with a cellular technology, such as LTE, WCDMA or global system for mobile communications, GSM, for example. In the illustrated example, access point 130 and base station 120 are interconnected by connections 125, which may be considered a backbone network of an operator controlling both nodes. Mobiles in cells 121 and 131 may access the Internet, for example, using base station 120 and access point 130, respectively, and connections 125. In the illustrated example, the cell controlled by base station 120 is larger than the cell controlled by access point 130, but in other embodiments the cells may be roughly the same size, or the cell controlled by access point 130 may be larger. In the illustrated arrangement, cell 131 may be seen as a hotspot or special access area mostly enclosed in the cell coverage area of cell 121. Cell 131 may comprise, for example, a cellular cell such as a home nodeB or closed subscriber cell.

Mobile 110 is illustrated as being in radio contact with base station 120 via wireless connection 112. Wireless connection 112 may be configured to operate in accordance with the same technology as cell 121, for example a cellular technology such as WCDMA. Wireless connection 112 may comprise an uplink for conveying information from mobile 110 to base station 120. Wireless connection 112 may comprise a downlink for conveying information from base station 120 to mobile 110. Mobile 110 is likewise illustrated as being in radio contact with access point 130 via wireless connection 114. Wireless connection 114 may be configured to operate in accordance with the same technology as cell 131, for example a non-cellular technology such as WLAN. Wireless link 114 may comprise at least one of an uplink and a downlink as described above. Wireless connections 112 and 114 are illustrative only and simultaneous active connection to base station 120 and access point 130 is not required in all embodiments of the invention.

Further mobile 150 is illustrated in FIG. 1 as being in the cell coverage area of cell 121, but not in the cell coverage area of cell 131. Therefore, further mobile 150 may communicate with base station 120, but from its present location not with access point 130. Overall for mobiles to be able to communicate with both base station 120 and access point 130, the mobiles need to be furnished with capability to communicate using the access technology in use in the respective nodes. For example, where cell 121 uses the GSM access technology and cell 131 uses the WiMAX access technology, a mobile needs GSM and WiMAX connectivity in order to be able to choose, which access to use when in the overlap area of cells 121 and 131.

When cells 121 and 131 are cells of a same operator, or of two operators in a collaboration arrangement, it may become useful to manage mobiles in the overlap area of the respective cell coverage areas in a joint manner. For example, where cell 121 is highly loaded in the sense that a large number of mobiles are actively using it, and simultaneously cell 131 is lightly loaded in the sense that few mobiles are actively using it, it may be advantageous to cause at least one mobile disposed in the overlap coverage area to switch to using cell 131. This way, the high loading status of cell 121 is alleviated, and a load factor of cell 131 is elevated making cell 131 less idle.

A node may be tasked with controlling a load balance between cells 121 and 131. Such a node may be either base station 120 or access point 130, or it may be a further node of a compound network enabled to communicate via connections 125. The node may receive load reports, or otherwise determine the load status of, cells 121 and 131. The node may store a target or optimal load factor for at least one of cells 121 and 131. The node may store a maximum load factor for at least one of cells 121 and 131. By comparing current or expected load to information stored in the node, the node may decide that causing at least one mobile in the overlap coverage area to change to another access would be useful. The specific logic used in determining whether changing attachment is useful is implementation specific and may depend on factors specific to cells 121 and 131, such as malfunctions or capacity limitations.

To effect a change in attachment to another access, known as a handover, the node may cause signaling to occur to trigger the handover. For example, where a mobile attached to cell 121 is to be handed over to cell 131, base station 120 may be caused to transmit over wireless link 112 a handover command to the mobile, and the mobile may be configured to responsively take actions to switch to the access provided by access point 130. Where cells 121 and 131 operate using different access technologies, the handover may be known as an inter-radio access technology or inter-RAT handover.

Handovers may be initiated, depending on implementation and access technology, by the network or by mobiles. Where a larger number of mobiles is to be handed over to another access in connection with balancing a load between cells, sending individual handover commands to each of the mobiles would entail a larger signaling burden than in the case of a single mobile to be handed over. It would therefore make sense to indicate to mobiles collectively, how the network wants them to behave. While referred to as a handover, in general a mobility event, or a change of access, may comprise, alternatively or additionally to a handover, a cell reselection or an initial attachment to an access, such as just connecting to WLAN.

According to some embodiments of the invention, the network is configured to transmit distribution factors to the mobiles, wherein the distribution factors comprise indications how the network would prefer the mobiles to act as a group. For example, where base station 120 or another node determines that the load in cell 121 is higher than is desirable, for example the load is at a level that causes a degradation in a quality of service provided to subscribers in the cell, base station 120 may be caused to transmit a distribution factor in cell 121 explicitly or implicitly instructing 25%, for example, of mobiles in cell 121 to handover to other cells. In some embodiments, the distribution factor is broadcasted in cell 121 so that all mobiles in cell 121 receive it. Responsive to receiving the distribution factor, mobiles may react by determining whether they should attempt handover to other cells, or other accesses. For example, where the distribution factor instructs 25% of mobiles to attempt handover to other accesses, a mobile may, responsive to receiving the distribution factor, cause a random number to be generated, the random number being comprised in the interval from zero to one hundred. In case the generated random number is at most 25, the mobile will in that case make an attempt to handover to a different access. In case the generated random number is over 25, the mobile will in that case remain in cell 121. In general, the mobile may perform a probabilistic procedure with the distribution factor to determine, whether actions are needed. As all mobiles receiving the distribution factor act the same way, it would be expected that about 25% of them would attempt handover to a new access. The figure of 25%, and generating a random number between zero and one hundred are naturally only examples. In the example of FIG. 1, mobile 150, being in coverage of cell 121 only, may be configured to ignore the distribution factor since it has no choice as to which, access to use, cell 121 being the only possibility. Mobiles in general may be configured to ignore distribution factors if they can only use a single access. Mobiles may in general be configured to ignore a distribution factor relating to using an access that cannot provide a required quality of service. A quality of service can be provided in terms of radio connection quality or access point capability information, for example. For example, a certain access point or base station may only be capable of providing a bitrate of a certain value, or a certain access point may be unable to offer circuit-switched service.

Alternatively or additionally to broadcasting, the distribution factor may be transmitted in cell 121 via dedicated signaling to all or a subset of mobiles in cell 121. The distribution factor may be transmitted, for example, to zero percent of mobiles in a cell or to one hundred percent of mobiles in a cell. The distribution factor may be, for example, zero or one which would lead to all or none of mobiles being allowed to use the access the distribution factor relates to.

According to some embodiments of the invention, the network is configured to provide one distribution factor per available access. In the example of FIG. 1, this would mean that mobile 110 is provided with two distribution factors. Mobile 110 would then use the distribution factors to determine, whether to use the access of cell 121 or the access of cell 131. For example, the distribution factor of cell 121 may be 35% and the distribution factor of cell 131 may be 65%. Responsive to mobile 110 determining that it has a choice of access to use, in other words that it is disposed in the overlap area, it may be configured to use a probabilistic procedure, for example similar to the one described above, to determine which access to use. If the mobile would be in an overlap of three distinct accesses, it may receive and use three distribution factors. In general, where there is more than one access available, each of the accesses being associated with a distribution, factor, mobile 100 may be configured to generate a random number comprised in an interval from zero to a sum of the distribution factors. Alternatively the distribution factors may be scaled to a suitable size, maintaining their relative amplitudes, before being input into the probabilistic procedure to select one of the accesses for use.

Where a network comprises only two accesses, the network may transmit a single distribution factor with the understanding that mobiles may use it to determine whether to use the access associated with the single distribution factor, and in case the probabilistic procedure indicates the mobile is not to use the access associated with the single distribution factor, the mobile would in that ease use the other of the two accesses, Distribution factors may be disseminated in ceils of accesses using broadcast signaling, the broadcast signaling not being explicitly addressed to any specific mobile, rather the broadcast signaling being meant for all mobiles in the cell, for example over a broadcast channel. Examples of broadcast signaling comprise system information, SI, in WCDMA access technology, and beacon information in WLAN access technology.

Mobiles storing at least one distribution factor may be configured to perform, the probabilistic procedure at least one of upon receipt of at least one new or updated distribution factor, upon establishment of a new connection, upon expiry of a configured time period, upon completion of transfer of data, amounting to a configured amount of data.

In some embodiments, a subscription type of a subscriber affects how distribution, factors are used. For example, mobiles of premium-class subscribers may be configured to ignore distribution factors and always use the access with a highest quality of service available. Alternatively or additionally, mobiles of budget-class subscribers may employ distribution factors skewed to cause attachment to an access with lower quality of service with a higher likelihood than with normal-class subscribers.

In some embodiments, separate distribution factors may be defined for different classes of service. For example, voice-over internet protocol service may be associated with a first set of distribution factors, circuit-switched voice calls may be associated with a second set of distribution factors, and data file transfer may be associated with a third set of distribution factors.

In some embodiments, operators may agree collaboration agreements to provide capability to each other as needed, for example a cellular operator may agree with an operator of a hotspot network, that in case of peak load in the cellular network, a fraction of the cellular users in a certain area may be caused to handover to hotspots of the hotspot network, provided there is available capacity in the hotspot network. The cellular and hotspot networks may be configured with rules under which they may negotiate automatically concerning handing over subscribers from the cellular network, within limits set by the collaboration agreement. Distribution factors may be automatically generated based on a result of the automatic negotiation, and disseminated in the cellular network to cause handovers of a traction of the cellular subscribers to the hotspot network.

Although discussed herein primarily in connection with wireless accesses, the invention is understood to also encompass embodiments where at least one of the accesses available is a wire-line access, such as for example Ethernet. In some embodiments, distribution factors transmitted by base station 120 and access point 130 are the same. In some embodiments, the distribution factors transmitted by base station 120 may differ from those transmitted by access point 130, to affect a load distribution between cell 121 and cell 131. In some embodiments, the distribution factors am global values that are the same in all cells comprised in a network of an operator. In some embodiments, the distribution factors are specific to an area of a cellular cell. In some embodiments, the distribution factors are specific to a tracking area. In some embodiments, the distribution factors are dynamically modified responsive to instantaneous load.

In general there is provided a first apparatus, such as for example mobile 110, or a control device for inclusion in mobile 110, to control the functioning thereof. Examples of a control device include processors, chipsets and systems-on-chip, SoCs. The first apparatus may comprise a receiver configured to receive a first distribution factor relating to using a first access. Where the first apparatus comprises a mobile 110, the receiver may comprise a radio receiver of the mobile, the radio receiver being configured to receive signaling from a network. Where the first apparatus comprises a control device, the receiver may comprise an input pin and/or port comprised in the control device, the input pin and/or port being configured to receive information from a radio receiver comprised in a mobile 110, when the control device is included in a mobile 110, via electrical leads internal to mobile 110. The first distribution factor may be indicative of a probability with which the network instructs the first apparatus to use or to not use the first access.

The first apparatus may comprise at least one processing core configured to determine, using a probabilistic procedure, based at least in part on the first distribution factor, whether the apparatus is to use the first access. Using a probabilistic procedure may comprise generating a random number as described above. A random number may be generated using a random number generator, for example based on thermal or radio noise, or based on a software process, the random number generator being comprised in the first apparatus or operatively connected to the first apparatus. The at least one processing core may be configured to, based on a result of the determination, select an access and to cause the apparatus to use to the selected access. For example, the first access may be selected for use, or alternatively the first access may be de-selected for use, meaning that another access is selected to be used.

In some embodiments, the receiver is further configured to receive a second distribution factor relating to using a second access, and wherein the determination is based at least in part on the second distribution factor. In other words, in these embodiments the determination uses at least the first and the second distribution factors, the determination being used to select an access for use, the selected access comprising for example the first or the second access.

In some embodiments, the first access comprises a celluler access. In some embodiments, the second access comprises a non-cellular access. In some embodiments, at least one of the access is a wire-line access.

In some embodiments, the receiver is configured to receive at least three distribution factors, each of the at least three distribution factors relating to one access, and wherein the determination is based at least in part on the at least three distribution factors. Each of the at least three distribution factors may be indicative of a probability with which the network instructs the first apparatus to use the respective related access.

In some embodiments, the at least one processing core is configured to perform the determination to select an access to be used as part of an establishment process for establishing a new connection. In other words, the at least one processing core may be configured to perform the probabilistic procedure responsive to a connection establishment procedure being initiated. A connection establishment procedure may be initiated responsive to a user activating an application requiring a network connection, for example.

In some embodiments, the at least one processing core is configured to perform the determination and selecting periodically. In these embodiments the first apparatus may re-perform the probabilistic procedure at set time intervals when at least one network connection is active in the first apparatus and at least one suitable alternative access is available.

In some embodiments, the at least one processing core is configured to perform the determination each time the apparatus has at least one of received and transmitted a predetermined amount of data. In these embodiments, the at least one processing core may be configured to keep track of an amount of data transmitted or received since the last time the probabilistic procedure was performed, and responsive to the transmitted or received data reaching a set amount, re-performing the probabilistic procedure. For example, the probabilistic procedure, and the selection, may be performed each time the apparatus has received a full 10 megabytes from the network.

In general repeatedly re-performing the probabilistic procedure in mobiles may cause the mobiles to maintain a distribution approximately in line with what the network has signaled it prefers in form of the distribution factors.

In some embodiments, at least one distribution factor, or at least one set of distribution factors, is specific to a type of connection. A type of connection may comprise at least one of a voice over internet protocol connection, a hypertext transfer protocol connection and a file transfer connection.

Figure 3:
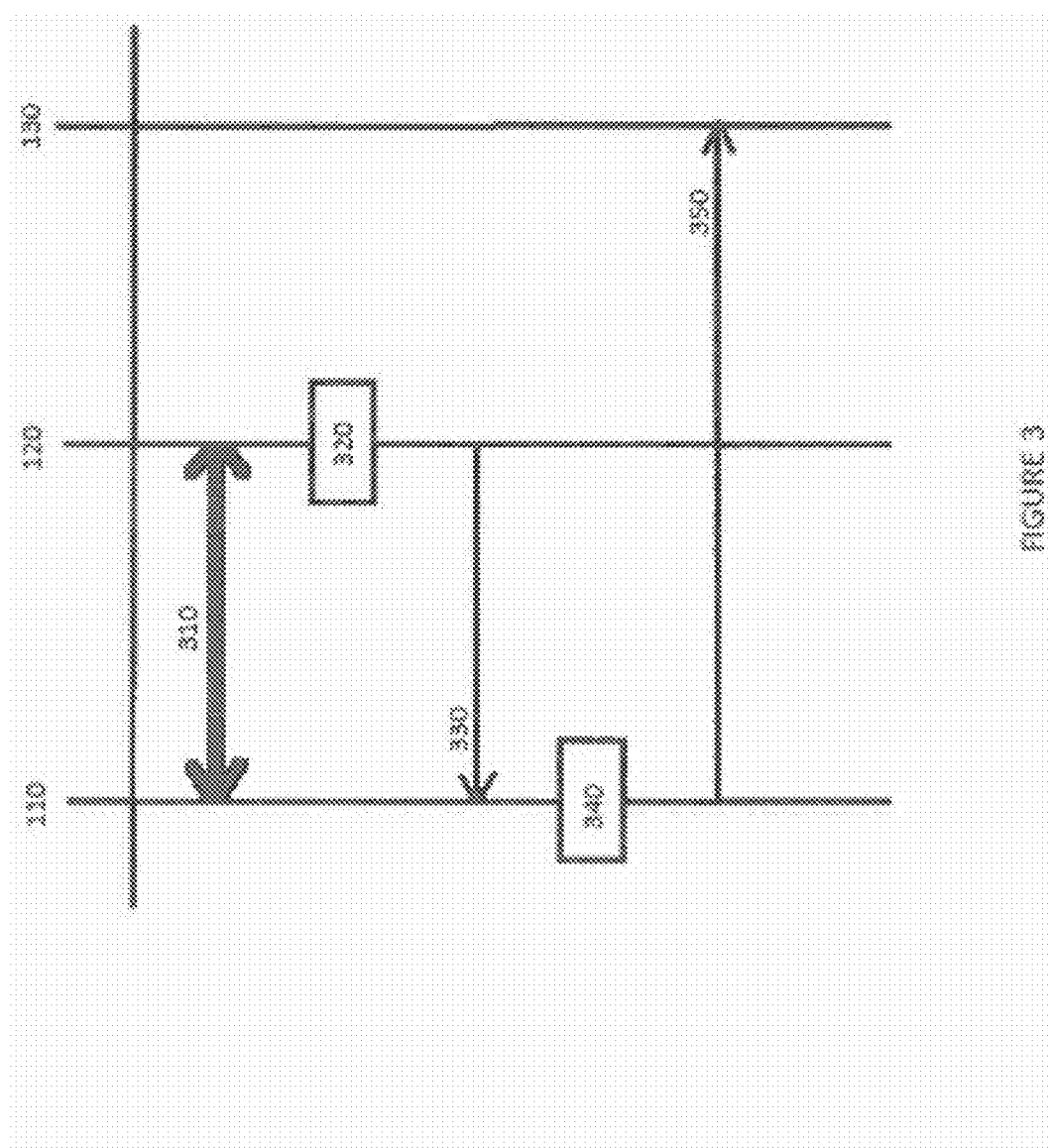
FIG. 3 is a first signaling diagram illustrating signaling according to at least some embodiments of the invention.

FIG. 3 is a first signaling diagram illustrating signaling according to at least some embodiments of the invention. Illustrated are, as vertical axes, mobile 110, base station 120 an access point 130 of FIG. 1. Time advances in the signaling diagram from top to bottom. Initially, in phase 310, mobile 110 is attached to base station 120, for example to a cell controlled by base station 120. In phase 310, mobile 110 may have at least one active connection via base station 120, or alternatively mobile 110 may be attached to base station 120 without an active connection. An active connection may comprise, for example, an allocated radio bearer or an application level connection. An active connection may comprise a stream of application data, such as a stream of voice data in telephony. In phase 320, base station 120, or another node, makes a determination concerning load of a cell controlled by base station 120 and a cell, or hotspot, controlled by access point 130. Reponsive to a determination that load is higher in the cell controlled by base station 120, base station 120 may transmit a distribution factor to mobile 110, phase 330. The transmitting of phase 330 may take place via broadcasted signaling, or it may take place via dedicated signaling to mobile 110 and, optionally, all other mobiles in the cell controlled by bass station 120. In phase 340, which may occur responsive to phase 330 or otherwise subsequently to it, mobile 110 may perform a probabilistic procedure to determine, based on a probabilistic procedure and the distribution factor received in phase 330, whether mobile 110 is to begin using access point 130 instead of base station 120. For example, the transmission of the distribution factor of phase 330 may effectively be an instruction to transfer a certain percentage, for example 15%, of mobiles in a cell controlled by base station 120 to another access. Where the probabilistic procedure indicates that mobile 110 is to be comprised in the certain percentage, mobile 110 is configured thereby to transmit an attachment request to access point 130, phase 350. In some embodiments, mobile 110 is caused in phase 350 to change attachment by another procedure than transmission of an attachment request. In general the probabilistic procedure of phase 340, using the distribution factor as input, may determine whether the attachment request of phase 350 is sent, or whether mobile 110 will remain in the access of base station 120.

Figure 4:
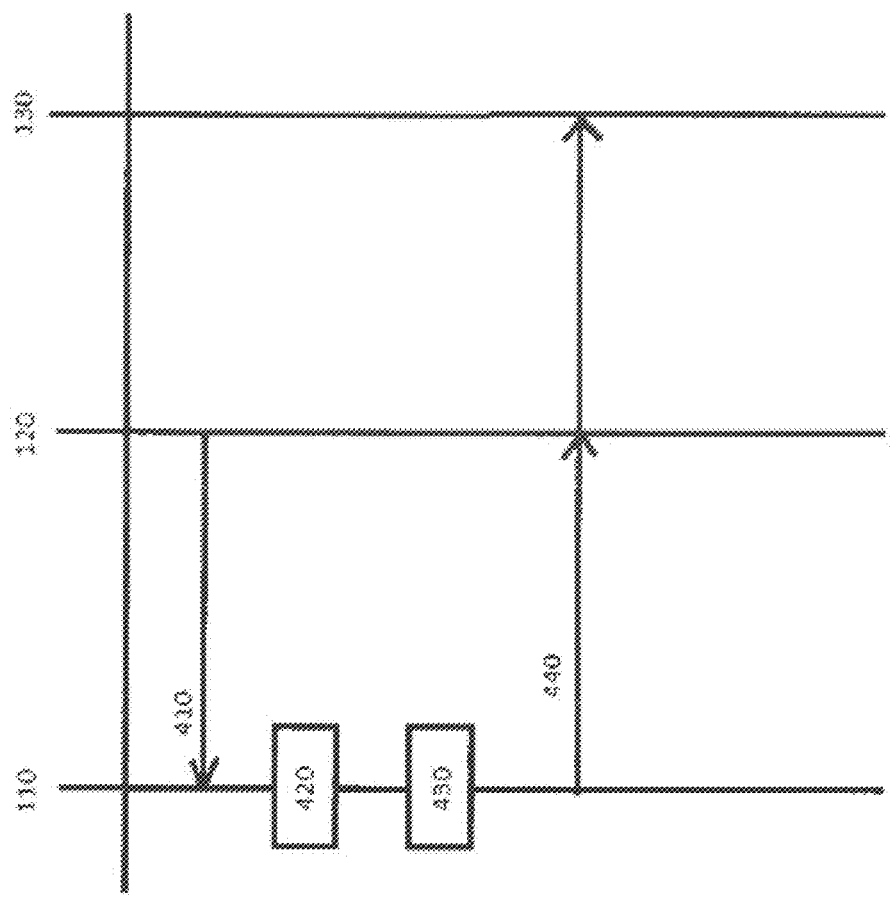
FIG. 4 is a second, signaling diagram illustrating signaling according to at least some embodiments of the invention.

FIG. 4 is a second signaling diagram illustrating signaling according to at least some embodiments of the invention. The vertical axes correspond to mobile 110, base station 120 and access point 130 as in FIG. 3. Before phase 410, mobile 110 may be attached to a cell controlled by base station 120, the attachment being in an active or an idle mode. In phase 410, base station 120 may transmit, using broadcast or dedicated signaling as described above, a first distribution factor relating to the access of base station 120 and a second distribution factor relating to the access of access point 130 to mobile 110. Although illustrated as a single message, the distribution factors may alternatively be transmitted using separate messages. In phase 420, mobile 110 may determine that it needs an active connection. Responsive to the determination of phase 420, mobile 110 may perform a probabilistic procedure with the received distribution factors, to determine whether to use the access of access point 130 for the active connection. In dependence of an outcome of the probabilistic procedure, mobile 110 may transmit, in phase 440, a request message to either base station 120 or access point 130. If the message of phase 440 is transmitted to base station 120, the message may comprise a connection request if the message of phase 440 is transmitted to access point 130, the message may comprise an association request to associate with access point 130 instead of base station 120. By the process of FIG. 4, the network may control a fraction of new active connections to be established via access point 130. In some embodiments, the same distribution factors may be transmitted in a cell controlled by access point 130. Alternatively the distribution factors transmitted in the cell controlled by access point 130 may differ from those transmitted in the cell controlled by base station 120, to affect a load distribution between the cells.

Figure 5:
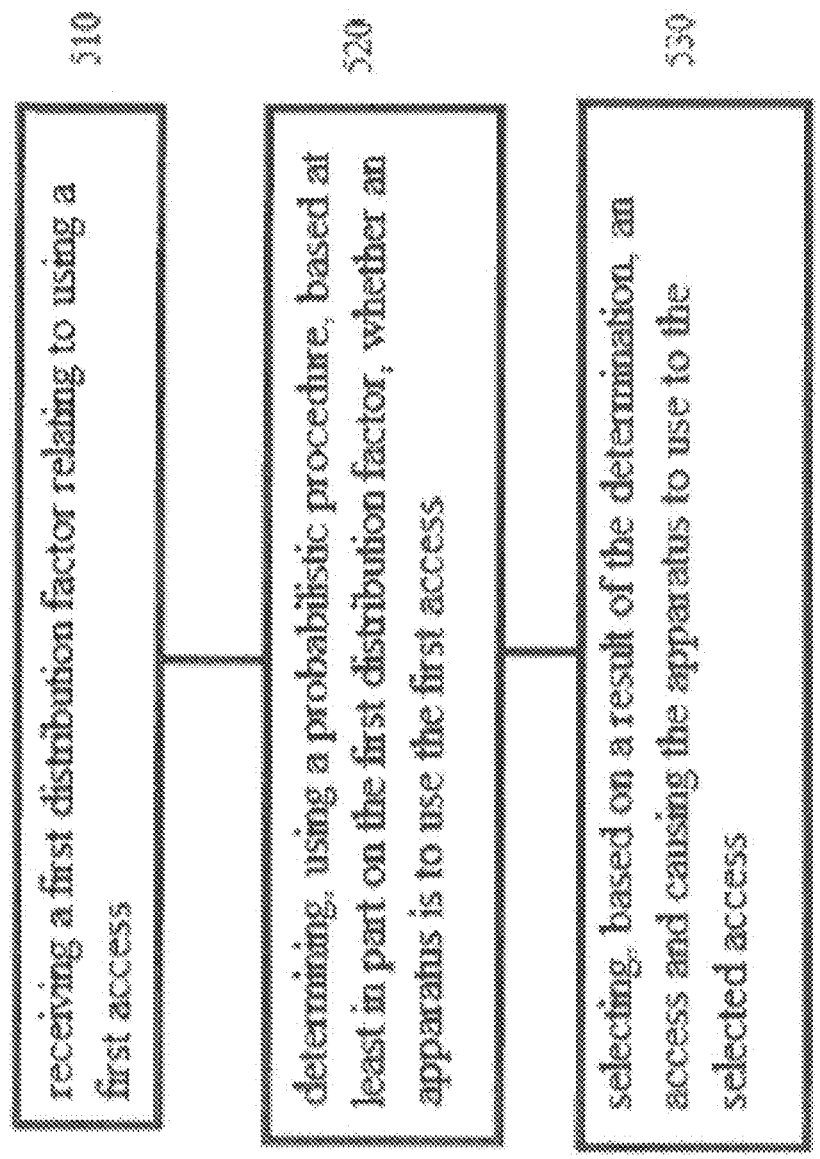
FIG. 5 is a flow diagram of a first method in accordance with at least some embodiments of the invention.

FIG. 5 is a flow diagram of a first method in accordance with at least some embodiments of the invention. The steps of the method illustrated in FIG. 5 may take place in mobile 110, for example. Phase 510 comprises receiving a first distribution factor relating to using a first access. Phase 520 comprises determining, using a probabilistic procedure, based at least in part on the first distribution factor, whether an apparatus, such as for example mobile 110, is to use the first access. Phase 530 comprises selecting, based on a result of the determination, an access and causing the apparatus to use to the selected access.

Figure 6:
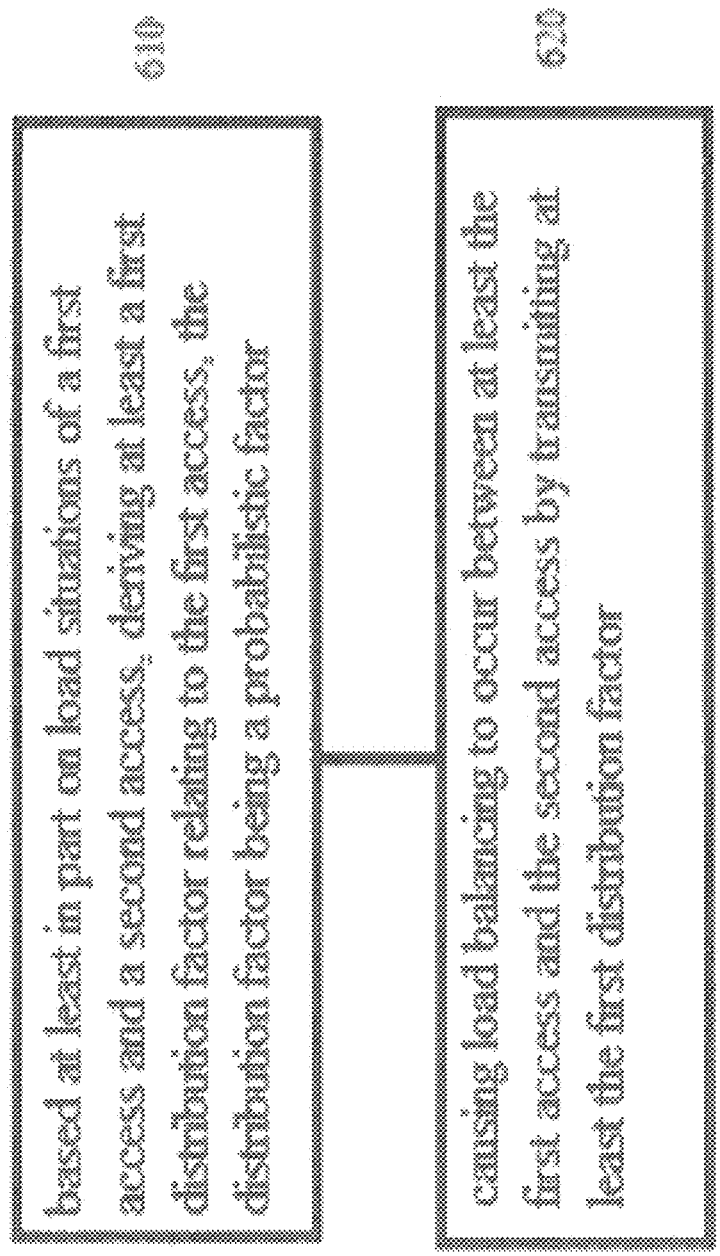
FIG. 6 is a flow diagram of a second method in accordance with at least some embodiments of the invention.

FIG. 6 is a flow diagram of a second method in accordance with at least some embodiments of the invention. The steps of the method illustrated in FIG. 6 may take place in base station 120, for example. Phase 610 comprises deriving, based at least in part on load situations of a first access and a second access, at least a first distribution factor relating to the first access, the distribution factor being a probabilistic or fractional factor, and causing load balancing to occur between at least the first access and the second access by transmitting at least the first distribution factor. The first distribution factor may comprise an explicit or implicit instruction to assign a fraction of traffic or mobiles to the first access, the fraction being defined by, in or via the first distribution factor.

Figure 2:
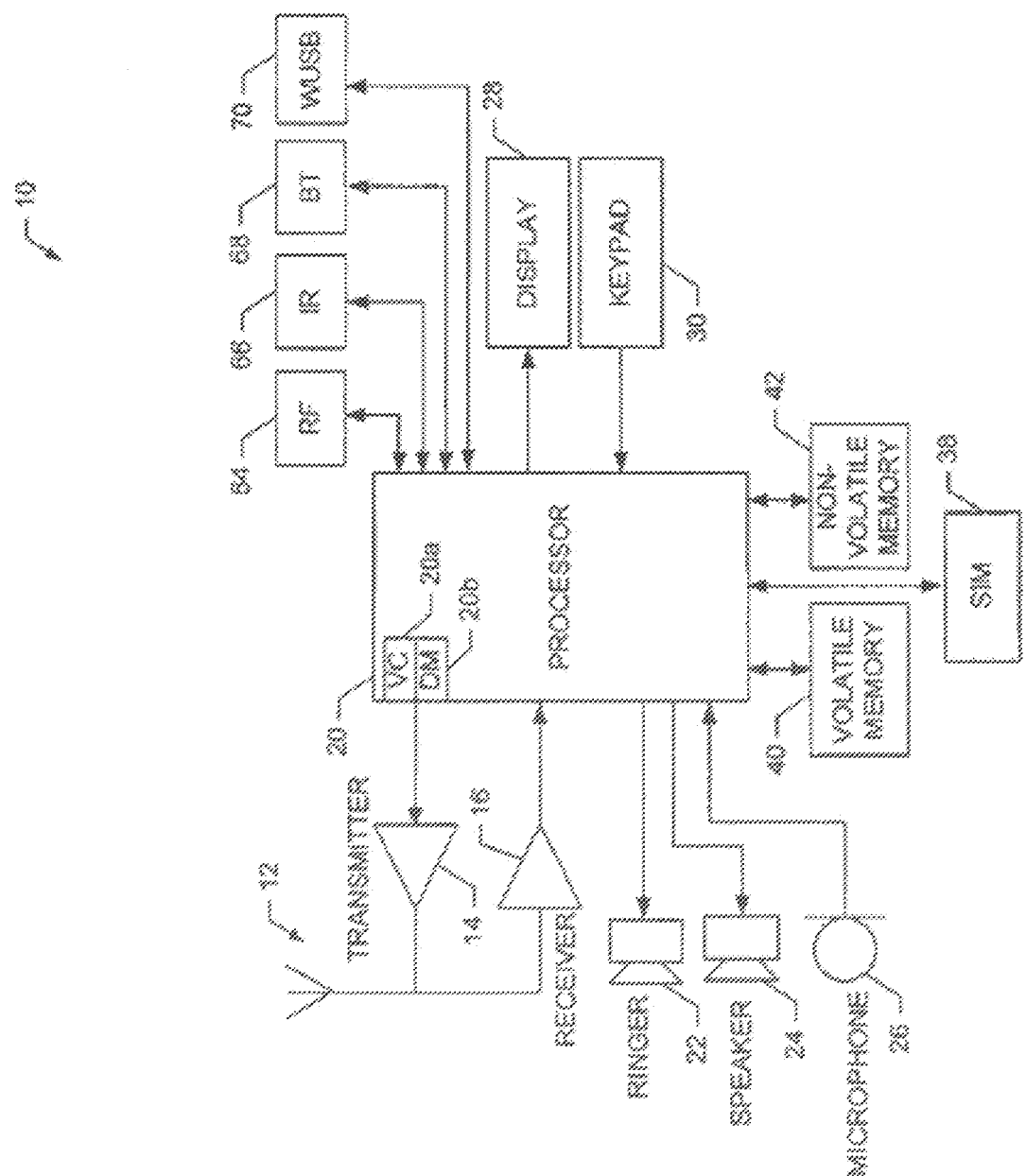
FIG. 2 illustrates a block diagram of an apparatus in accordance with an example embodiment of the invention.

FIG. 2 illustrates a block diagram of an apparatus 10 such as, for example, a mobile terminal such as mobile 110, in accordance with an example embodiment of the invention. While several features of the apparatus are illustrated and will be hereinafter described for purposes of example, other types of electronic devices, such as mobile telephones, mobile computers, portable digital assistants, PDAs, pagers, laptop computers, desktop computers, gaming devices, televisions, routers, home gateways, and other types of electronic systems, may employ various embodiments of the invention.

As shown, the mobile terminal 10 may include at least one-antenna 12 in communication with a transmitter 14 and a receiver 16. Alternatively transmit and receive antennas may be separate. The mobile terminal 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise processor 20 may be configured to control other elements of apparatus 10 by effecting control signaling via electrical leads connecting processor 20 to the other elements, such as for example a display or a memory. The processor 20 may, for example, be embodied as various means including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application specific integrated circuit, ASIC, or field programmable gate array, FPGA, or some combination thereof. Accordingly, although illustrated in FIG. 2 as a single processor, in some embodiments the processor 20 comprises a plurality of processors or processing cores. Signals sent and received by the processor 20 may include signaling information in accordance with an air interface standard of an applicable cellular system, and/or any number of different wireline or wireless networking techniques, comprising but not limited to Wi-Fi, wireless local access network, WLAN, techniques such as Institute of Electrical and Electronics Engineers, IEEE, 802.11, 802.16, and/or the like. In addition, these signals may include speech data, user generated data, user requested data, and/or the like. In this regard, the apparatus may be capable of operating with one or more air interface standards, communication protocols, modulation types, access types, and/or the like. More particularly, the apparatus may be capable of operating in accordance with various first generation, 1G, second generation, 2G, 2.5G, third-generation, 3G, communication protocols, fourth-generation, 4G, communication protocols, Internet Protocol Multimedia Subsystem, IMS, communication protocols, for example, session initiation protocol, SIP, and/or the like. For example, the apparatus may be capable of operating in accordance with 2G wireless communication protocols IS-136, Time Division Multiple Access TDMA, Global System for Mobile communications, GSM, IS-95, Code Division Multiple Access, CDMA, and/or the like. Also, for example, the mobile terminal may be capable of operating in accordance with 2.5G wireless communication protocols General Packet Radio Service. GPRS, Enhanced Data GSM Environment, EDGE, and/or the like. Further, for example, the apparatus may be capable of operating in accordance with 3G wireless communication protocols such as Universal Mobile Telecommunications System, UMTS, Code Division Multiple Access 2000, CDMA2000G, Wideband Code Division Multiple Access, WCDMA, Time Division-Synchronous Code Division. Multiple Access, TD-SCDMA, and/or the like. The apparatus may be additionally capable of operating in accordance with 3.9G wireless communication protocols such as Long Term Evolution, LTE, or Evolved Universal Terminal Radio Access Network, E-UTRAN, and/or the like. Additionally, for example, the apparatus may be capable of operating in accordance with fourth-generation, 4G, wireless communication protocols such, as LTE Advanced and/or the like as well as similar wireless communication protocols that may be developed in the future.

Some Narrow-band Advanced Mobile Phone System, NAMPS, as well as Total Access Communication System, TACS, mobile terminal apparatuses may also benefit from embodiments of this invention, as should dual or higher mode phone apparatuses, for example, digital/analog or TDMA/CDMA/analog phones. Additionally, apparatus 10 may be capable of operating according to Wi-Fi or Worldwide Interoperability for Microwave Access, WiMAX, protocols.

It is understood that the processor 20 may comprise circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder, VC, 20a, an internal data modem, DM, 20b, and/or the like. Further, the processor may comprise functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the mobile terminal 10 to transmit and receive web content, such as location-based content, according to a protocol, such as wireless application protocol, WAP, hypertext transfer protocol, HTTP, and/or the like Apparatus 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. Although not shown, the apparatus may comprise a battery for powering various circuits related to the mobile terminal, for example, a circuit to provide mechanical vibration as a detectable output. The user input interface may comprise devices allowing the apparatus to receive data, such as a keypad 30, a touch display, which is not shown, a joystick, which is not shown, and/or at least one other input device. In embodiments including a keypad, the keypad may comprise numeric 0-9 and related keys, and/or other keys for operating the apparatus.

As shown in FIG. 2, apparatus 10 may also include one or more means for sharing and/or obtaining data. For example, the apparatus may comprise a short-range radio frequency, RF, transceiver and/or interrogator 64 so data may be shared with and/or obtained from electronic devices in accordance with RF techniques. The apparatus may comprise other short-range transceivers, such as, for example, an infrared, IR, transceiver 66, a Bluetooth™, BT, transceiver 68 operating using Bluetooth™ brand wireless technology developed by the Bluetooth™ Special Interest Group, a wireless universal serial bus, USB, transceiver 70 and/or the like. The Bluetooth™ transceiver 68 may be capable of operating according to low power or ultra-low power Bluetooth™ technology, for example, Wibree™, radio standards. In this regard, the apparatus 10 and, in particular, the short-range transceiver may be capable of transmitting data to and/or receiving data from electronic devices within a proximity of the apparatus, such as within 10 meters, for example. Although not shown, the apparatus may be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module, SIM, 38, a removable user identity module, R-UIM, and/or the like, which may store information elements related to a mobile subscriber. In addition to the SIM, the apparatus may comprise other removable and/or fixed memory. The apparatus 10 may include volatile memory 40 and/or non-volatile memory 42. For example, volatile memory 40 may include Random Access Memory, RAM, including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, etc., optical disc drives and/or media, non-volatile random access memory, NVRAM, and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing functions of the mobile terminal. For example, the memories may comprise an identifier, such as an international mobile equipment identification, IMEI, code, capable of uniquely identifying apparatus 10.

Without in any way limiting the scope, interpretation, or application of the claims appearing below, a technical effect of one or more of the example embodiments disclosed herein is that load balancing is effected for a plurality of mobile stations using a reduced signaling load in the network. Another technical effect of one or more of the example embodiments disclosed herein is that subscription types may be offered differentiated quality of service. Another technical effect of one or more of the example embodiments disclosed herein is that networks of different operators may be caused to act collaboratively to preserve a quality of service for subscribers.

Embodiments of the present invention may be implemented in software, hardware, application logic or a combination of software, hardware and application logic. The software, application logic and/or hardware may reside on memory 40, the control apparatus 20 or electronic components, for example. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and deplected in FIG. 2. A computer-readable medium may comprise a computer-readable non-transitory storage medium that may be any media or means that can contain or store the instructions for use by or in connection with an instruction execution system, apparatus, or device, such as a computer. The scope of the invention comprises computer programs configured to cause methods according to embodiments of the invention to be performed.

If desired, the different functions discussed herein may be performed in a different order and/or concurrently with, each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several, variations and modifications which may be made without departing from the scope of the present invention as defined in the appended claims.

What is claimed is:

1. A user equipment apparatus, comprising:
   a receiver configured to receive, while in active mode, a first probabilistic distribution factor relating to using a first access, the active mode not being an idle mode;
   at least one processing core configured to determine, using a probabilistic procedure, based at least in part on the first probabilistic distribution factor, whether the user equipment apparatus is to use the first access, the probabilistic procedure including generating a random number, and
   wherein the at least one processing core is configured to, based on a result of the determination, select an access and to cause the apparatus to use to the selected access, and to determine whether the user equipment apparatus is to use the first access responsive to receiving the first probabilistic distribution factor, wherein a subscription type of a subscriber of the user equipment affects how the first probabilistic distribution factor is used, in a manner that for premium-class subscribers distribution factors are ignored and always the access with a highest quality of service available is used and/or for budget-class subscribers distribution factors are employed skewed to cause attachment to an access with lower quality of service with a higher likelihood than with normal-class subscribers.

2. The user equipment apparatus according to claim 1, wherein the receiver is further configured to receive a second probabilistic distribution factor relating to using a second access, and wherein the determination is based at least in part on the second probabilistic distribution factor.

3. The user equipment apparatus according to claim 1, wherein the first access comprises a cellular wireless access.

4. The user equipment apparatus according to claim 2, wherein the second access comprises a non-cellular access.

5. The user equipment apparatus according to claim 1, wherein the receiver is configured to receive at least three probabilistic distribution factors, each of the at least three probabilistic distribution factors relating to one access, and wherein the determination is based at least in part on the at least three probabilistic distribution factors.

6. The user equipment apparatus according to claim 1, wherein the at least one processing core is configured to perform the determination to select an access to be used as part of an establishment process for establishing a new connection.

7. The user equipment apparatus according to claim 1, wherein the at least one processing core is configured to perform the determination periodically.

8. The user equipment apparatus according to claim 1, wherein the at least one processing core is configured to perform the determination each time the apparatus has at least one of received and transmitted a predetermined amount of data.

9. The user equipment apparatus according to claim 1, wherein at least one probabilistic distribution factor is specific to a type of connection.

10. The user equipment apparatus according to claim 9, wherein the type of connection comprises at least one of a voice over interne protocol connection, a hypertext transfer protocol connection, a file transfer connection and a connection with a defined minimum quality of service.

11. The user equipment apparatus according to claim 1, wherein the apparatus is configured to decide based on a subscription level, whether to ignore the first probabilistic distribution factor.

12. The user equipment apparatus according to claim 1, wherein the user equipment apparatus comprises a mobile communication device, the user equipment apparatus further comprising an antenna coupled to the receiver and configured to provide signals to the at least one processing core.

13. A load distribution method, comprising:
    receiving, while in active mode, a first probabilistic distribution factor relating to using a first access, the active mode not being an idle mode;
    determining, using a probabilistic procedure, based at least in part on the first probabilistic distribution factor, whether an apparatus is to use the first access, the probabilistic procedure including generating a random number, and
    selecting, based on a result of the determination, an access and causing the apparatus to use to the selected access, and determining whether the apparatus is to use the first access responsive to receiving the first probabilistic distribution factor, wherein a subscription type of a subscriber of a user equipment affects how the first probabilistic distribution factor is used, manner that for premium-class subscribers distribution factors are ignored and always the access with a highest quality of service available is used and/or for budget-class subscribers distribution factors are employed skewed to cause attachment to an access with lower quality of service with a higher likelihood than with normal-class subscribers.

14. The load distribution method according to claim 13, further comprising receiving a second probabilistic distribution factor relating to using a second access, and wherein the determination is based at least in part on the second probabilistic distribution factor.

15. The load distribution method according to claim 13, wherein the first access comprises a cellular wireless access.

16. The load distribution method according to claim 13, wherein the first probabilistic distribution factor is received from a broadcasted message not explicitly addressed to the apparatus.

17. An apparatus, comprising:
    at least one processor; and
    at least one memory including computer program code;
    the at least one memory and the computer program code configured to, with the at least one processor, cause the apparatus to perform at least the following:
      based at least in part on load situations of a first access and a second access, derive at least a first distribution factor relating to the first access, the first distribution factor being a probabilistic factor, and
      cause the apparatus to load balance between at least the first access and the second access by transmitting at least the first distribution factor to mobiles which are in active mode, wherein the first distribution factor is arranged to cause part of the mobiles to change access responsive to receiving the first distribution factor as a result of a probabilistic process which includes generating a random number, the active mode not being an idle mode, wherein subscription types of subscribers of the mobiles affect how the first probabilistic distribution factor is used, in a manner that for premium-class subscribers distribution factors are ignored and always the access with a highest quality of service available is used and/or for budget-class subscribers distribution factors are employed skewed to cause attachment to an access with lower quality of service with a higher likelihood than with normal-class subscribers.

18. The apparatus according to claim 17, wherein the first distribution factor is a factor relating to user equipments as a group and not relating to any specific user equipment.

19. A method, comprising:
 based at least in part on load situations of a first access and a second access, deriving at least a first distribution factor relating to the first access, the distribution factor being a probabilistic factor, and
 causing to load balance between at least the first access and the second access by transmitting at least the first distribution factor to mobiles which are in active mode, wherein the first distribution factor is arranged to cause part of the mobiles to change access responsive to receiving the first distribution factor as a result of a probabilistic process which includes generating a random number, the active mode not being an idle mode, wherein subscription types of subscribers of the mobiles affect how the first probabilistic distribution factor is used, in a manner that for premium-class subscribers distribution factors are ignored and always the access with a highest quality of service available is used and/or for budget-class subscribers distribution factors are employed skewed to cause attachment to an access with lower quality of service with a higher likelihood than with normal-class subscribers.

20. The method according to claim 19, wherein the first distribution factor is a factor relating to user equipments as a group and not relating to any specific user equipment.

21. A computer program product comprising a non-transitory computer-readable medium bearing computer program code embodied therein for use with a computer, the computer program code comprising:
 code for receiving, while in active mode, a first probabilistic distribution factor relating to using a first access, the active mode not being an idle mode;
 code for determining, using a probabilistic procedure, based at least in part on the first probabilistic distribution factor, whether an apparatus is to use the first access, the probabilistic procedure including generating a random number, and
 code for selecting, based on a result of the determination, an access and for causing the apparatus to use to the selected access, and for determining whether the user to use the first access responsive to receiving the first probabilistic distribution factor, wherein a subscription type of a subscriber of a user equipment affects how the first probabilistic factor is used, in a manner that for premium-class subscribers distribution factors, are ignored and always the access with a highest quality of service available is used and/or for budget-class subscribers distribution factors are employed skewed to cause attachment to an access with lower quality of service with a higher likelihood than with normal-class subscribers.

* * * * *